Jan. 31, 1956   S. KUCHINSKY   2,733,409
PULSE CODE MODULATION SYSTEM
Filed Aug. 14, 1952   5 Sheets-Sheet 1

Fig. 1

INVENTOR
SAUL KUCHINSKY
BY
Donald W. Phillion
ATTORNEY

Jan. 31, 1956

S. KUCHINSKY

2,733,409

PULSE CODE MODULATION SYSTEM

Filed Aug. 14, 1952

INVENTOR
SAUL KUCHINSKY
BY
*Donald W. Phillion*
ATTORNEY

Jan. 31, 1956  S. KUCHINSKY  2,733,409
PULSE CODE MODULATION SYSTEM
Filed Aug. 14, 1952  5 Sheets-Sheet 4

Fig. 4

|  | SPADE ELECTRODE UPON WHICH ELECTRON BEAM IMPINGES DURING SAMPLING OPERATION. | | | | | | | | | |
|---|---|---|---|---|---|---|---|---|---|---|
|  | 11 | 12 | 13 | 14 | 15 | 16 | 17 | 18 | 19 | 20 |
| COLLECTOR RING 39 | X | O | X | O | X | O | X | O | X | O |
| COLLECTOR RING 40 | O | X | X | O | O | X | X | O | O | X |
| COLLECTOR RING 41 | O | O | O | X | X | X | X | O | O | O |
| COLLECTOR RING 42 | O | O | O | O | O | O | O | X | X | X |

INVENTOR
SAUL KUCHINSKY
BY
Donald W. Phillion
ATTORNEY

Jan. 31, 1956　　　　　S. KUCHINSKY　　　　2,733,409
PULSE CODE MODULATION SYSTEM
Filed Aug. 14, 1952　　　　　　　　　　　　5 Sheets-Sheet 5

INVENTOR
SAUL KUCHINSKY
BY
Donald W. Phillion
ATTORNEY 2,733,409
Patented Jan. 31, 1956

2,733,409

PULSE CODE MODULATION SYSTEM

Saul Kuchinsky, Philadelphia, Pa., assignor to Burroughs Corporation, Detroit, Mich., a corporation of Michigan Application August 14, 1952, Serial No. 304,344

10 Claims. (Cl. 332—11)

This invention relates generally to methods of metering instantaneous values of voltage signals and more particularly it relates to means for sampling electric signal amplitudes and translating said samples at predetermined intervals of time into discrete potential levels.

Various methods of examining instantaneous values of a varying signal at predetermined intervals of time and translating these instantaneous voltage levels into individual codes representative of the magnitude of the signal amplitude are known in the prior art. Modifications of such systems have been identified as pulse code modulation, pulse density modulation, pulse time modulation, pulse length modulation, and analog to digital conversion. Pulse code modulation, with which this invention deals, is characterized by instantaneous signal voltage amplitude sampling to obtain discrete potential levels and the translation of these discrete levels into individual code groups. Present pulse code modulation systems have characteristics of complexity, high cost to obtain reliability, and larger bulk which constitute a deterrent to large scale adoption of such systems.

An object of the invention is to provide an improved pulse modulation system having simplicity of structure.

Another object of the invention is to provide a relatively inexpensive pulse code modulation system having a high degree of reliability.

A third object of the invention is to provide a compact pulse code modulation system.

A fourth object of the invention is a pulse code modulation system capable of directly producing either a decimal digit and/or a coded form of output.

In accordance with one embodiment thereof the invention comprises a selector tube and a coding tube, the said selector tube comprising a plurality of output means comprising electrodes or elements each individually representing by a discrete potential level a substantially instantaneous sample value of signal amplitude, and each of said output electrodes or elements being individually and selectively energizable in accordance with the value of said instantaneous sample, and said coding tube comprising a plurality of input elements individually connected with the plurality of output electrodes or elements of said selector tube, a plurality of target positions, and means including said plurality of input elements for forming and directing an electron beam to selected ones of said plurality of target positions. The said plurality of input elements of said coding tube are individually responsive to energization of the associated one of said outputs of said selector tube to cause said electron beam of said coding tube to be directed towards the associated one of said target positions. The coding tube further comprises output means associated with each of said target positions to indicate decimally or in a coded manner, for any desired length of time, the position of said electron beam.

In accordance with one feature of the invention the above mentioned plurality of output means of the selector tube are individually coupled to the plurality of input means of the coding tube and are adapted to direct the electron beam of the coding tube to a particular preselected position in response to energization of one of said output means of said selector tube.

In accordance with another feature of the invention the pulse generating source utilized to provide the sampling pulse for the selector tube is also utilized to momentarily cut off the electron beam in the beam switching or coding tube.

These and other objects and features of the invention will be more fully understood from the following detailed description thereof when read in conjunction with the drawings in which.

Figure 1:
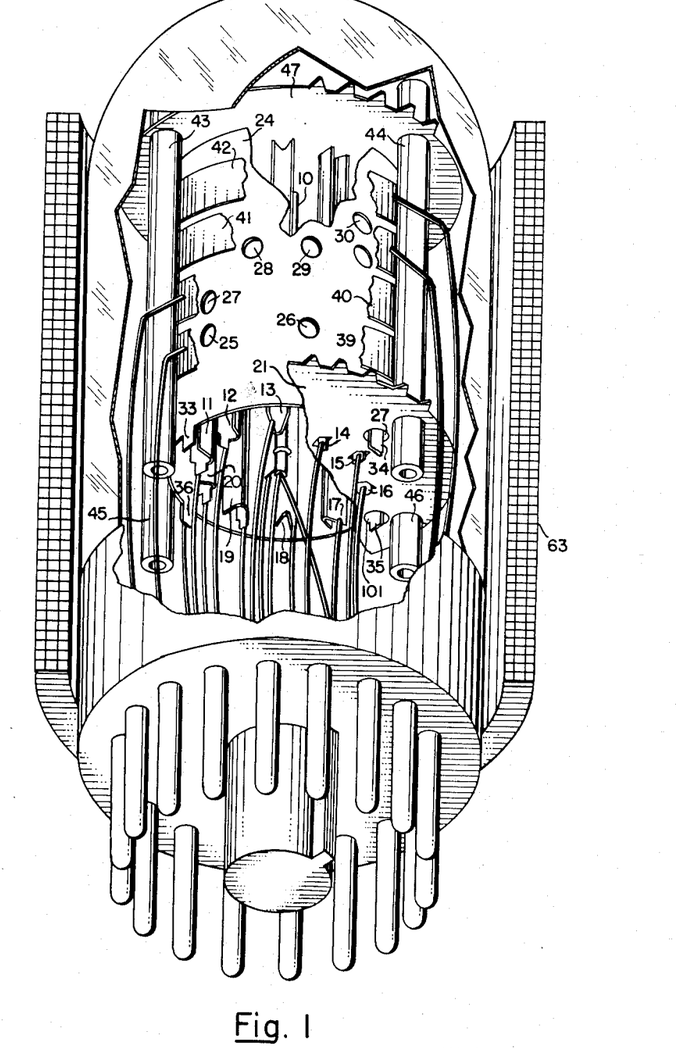
Fig. 1 is a perspective view of a coding tube which may be utilized in the invention.

Referring now to Fig. 1, there is shown a perspective view of an electron discharge device utilized in one embodiment of the invention. The tube is provided with means 163 for permeating the electrode structure with a magnetic field. As has been discussed hereinbefore, the beam switching or coding tube utilized in the invention has a plurality of input element or electrodes, which are usually referred to as spades, which are responsive to energization to cause an electron beam to assume one of a plurality of positions corresponding to the sampled value of the input signal or signals. The number of possible electron beam positions in the tube shown in Fig. 1 is determined by the number of spade electrodes 11, 12, 13, 14, 15, 16, 17, 18, 19, and 20. In the particular structure shown there are ten spade electrodes and consequently there are ten different and discrete possible positions for the electron beam which may be utilized in providing a coded output, if desired. It is to be noted that it is possible to have more than ten or less than ten discrete electron beam positions merely by increasing or decreasing the number of spade electrodes. If a four bit binary output code is utilized in the pulse code modulation system being considered, then it might be advantageous to use a sixteen spade tube, for example, since a four bit binary code has sixteen possible combinations. The functions of the spade electrodes with respect to the operation of the tube will be described in more detail hereinafter. The spade electrodes 11 through 20 are arranged concentrically around cathode 10 and spaced substantially equidistant apart. Anode 24 is positioned around the said spades 11 through 20 and substantially concentric with the spade electrodes and the cathode 10. A plurality (ten) of columns of apertures is provided in the anode 24. Each column of apertures is substantially parallel with the cathode 10 in the tube shown in Fig. 1. The maximum number of apertures in any given column is four and the minimum number is zero. The apertures at each beam position are aligned with respect to the space between adjacent spade electrodes and are located at one of four "levels" with respect to the axial length of the anode 24. Thus, all the aperture positions existing in the anode 24 would lie in the intersections of the anode 24 with four plane surfaces parallel to each other and substantially perpendicular to the axis of the cylindrical anode 24. The intersection of these four imaginary plane surfaces with the anode 24 can be arbitrarily designated as defining four levels of aperture positions, each level of aperture positions including one aperture position in each of said columns of apertures. However, an aperture may or may not be present at each aperture position, depending on the coding arrangement. Assume that the lowest or first level of aperture positions comprises apertures 25 and 26 of two different columns of apertures and also the first level aperture positions of the other columns of apertures. Since the aperture positions in the other columns do not exist in the portion of the anode visible to the eye in the drawing of Fig. 1, they are not shown therein. The second level of apertures comprises referenced aperture 27 and the second level aperture positions of all the other columns of apertures. The third level of apertures comprises apertures 28 and 29. The fourth level of apertures comprises aperture 30. The anode 24 has four lips such as lips 33, 34, 35, and 36 thereon at either end. These lips fit into circular apertures provided therefor in the mica spacer 21 and a similar spacer at the other end. For example, lip 34 of anode 24 fits into aperture 27 of mica spacer 21.

Collector rings 39, 40, 41, and 42 are secured to ceramic support rods 43, 44, 45, and 46. Alignment for collector rings 39, 40, 41, and 42 is obtained by securing support rods 43, 44, 45, and 46 in apertures provided therefor in mica spacers 21 and 47. Each of the four collector rings 39, 40, 41, and 42 is positioned so as to be aligned with a particular level of aperture positions of anode 24. Collector rings 39 through 42 are further positioned outside anode 24 and substantially concentric therewith.

The base of the tube which may be of ceramic, glass, or other insulating material has eighteen leads extending therefrom. Ten of these leads are secured individually to the ten lips of the ten spade electrodes where the said lips come through the apertures provided therefor in mica spacer 21. One terminal is connected to one of the lips of the anode 24 which protrudes through the mica spacer 21. Four of the leads are individually connected to each of the four collector rings 39, 40, 41, and 42. Two of the terminals extending from the base of the tube are electrically connected to the heater within cathode 10. Another terminal extending from the base of the tube is connected directly to the cathode 10. The tube is provided with means 163 for permeating the electrode structure with a magnetic field. Reference is hereby made to United States patent application Serial Number 291,531, filed June 3, 1952, by Saul Kuchinsky, entitled Multiple Position Electron Beam Device, for a more complete description of the structure shown in Fig. 1.

Figure 2:
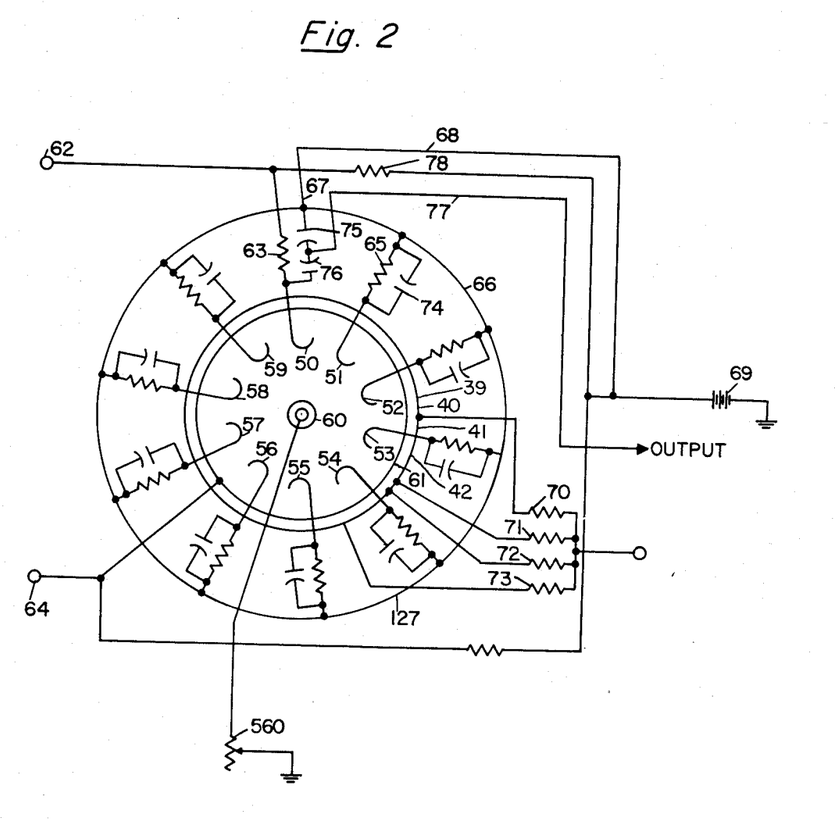
Fig. 2 is a schematic view of the structure of Fig. 1 with some external circuitry to illustrate the operation thereof.

In Fig. 2 there is shown the structure of Fig. 1 in a schematic form with some external circuitry. Spade electrodes 50, 51, 52, 53, 54, 55, 56, 57, 58, and 59 correspond to the spade electrodes 11 through 20 of Fig. 1. The said spade electrodes 50 through 59 are arranged concentrically around cathode 60. Cathode 60 is connected to ground through resistance 560, which is usually a variable resistance. In one embodiment of the invention, the value of the resistor 560 was 15,000 ohms. Anode 61 is positioned concentrically around spade electrodes 50 through 59 and collector electrodes 39, 40, 41, and 42 (shown as one circular line to which reference numeral 40 is applied) are arranged concentrically around anode 61. The collector rings 39 through 42 of Fig. 2 correspond to collector rings 39 through 42 of Fig. 1. Each spade electrode has a load circuit associated therewith. For example, spade electrode 51 has a load circuit consisting of 100,000 ohm resistance 65 and 10 micro-microfarads capacitor 74 arranged in parallel.

Spade electrode 50 is an exception to the foregoing statement in that the series arrangement of two 10 micro-microfarad capacitors 75 and 76 is placed in parallel with the load resistance. Each complete rotation of the electron beam is detected by spade electrode 50 and a signal is transmitted along output conductor 77. 250 volt battery source 69 is connected to conductor 66 through conductor 68, and to spade electrode 50 through resistance 63 and 100,000 ohm resistance 73. All of the values of components listed are by way of example only, and would vary according to the circuit parameters which are chosen. Indexing or "zeroizing" of the electron beam can be effected to spade 50 by applying a negative pulse on conductor 62.

Figure 3:
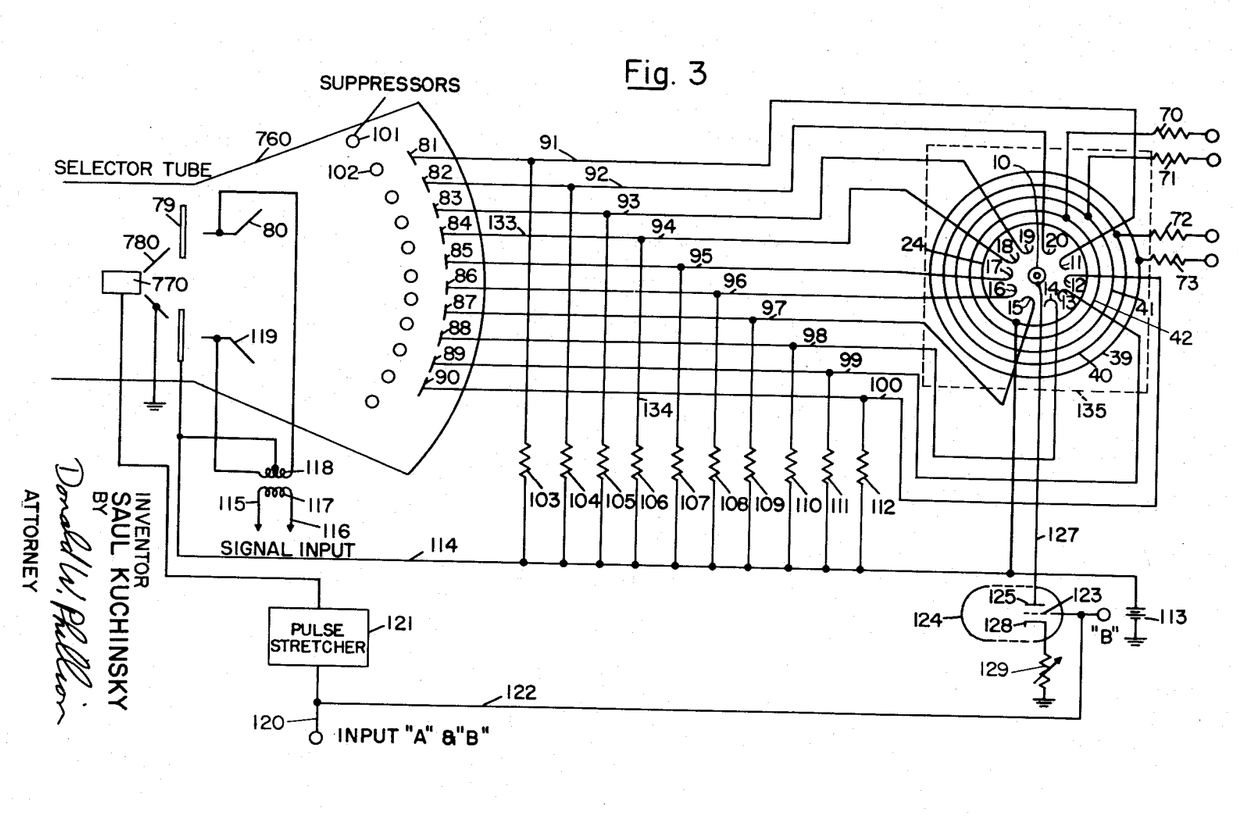
Fig. 3 is a schematic view of an embodiment of the present invention.

Referring now to Fig. 3, there is shown a schematic view of one embodiment of the present invention. Included within dotted block 135 is a schematic representation of the structure shown in Fig. 1. The symbols used to represent various elements of the structure within the block diagram 135 correspond to respective portions of the structure of Fig. 1; that is to say, elements 39, 40, 41, and 42 are collector rings corresponding to the collector rings bearing the same reference characters in Fig. 1. Spade electrodes 11, 12, 13, 14, 15, 16, 17, 18, 19, and 20 correspond to the spade electrodes bearing the same reference characters in Fig. 1. Anode 24 corresponds to anode 24 of Fig. 1. The various means of support for the electrodes of the various terminals of Fig. 1 are not shown in the structure of block diagram 135. Details of structure of tubes shown within block diagram 135 may be obtained from the description relating to Fig. 1 and also to the above identified United States patent application Serial No. 291,531, filed June 3, 1952, by Saul Kuchinsky.

The selector tube is comprised of an hermetically sealed envelope 760. Within the hermetically sealed envelope is a cathode means 770, accelerating electrode 79, focussing electrode 780, deflection electrodes 80 and 119, and the plurality of targets 81, 82, 83, 84, 85, 86, 87, 88, 89, and 90. The ten electrodes 81 through 90 are respectively individually connected to spade electrodes 11 through 20 of the structure within block 135 by means of conductors 91, 92, 93, 94, 95, 96, 97, 98, 99, and 100 respectively. Associated with each of the ten electrodes 81 through 90 of the selector tube are suppressor means. For example, suppressor means 101 is associated with target electrode 81. Suppressor means 102 is associated with target electrode 82. The suppressor means are all electrically tied together and are at about cathode potential to suppress "cross talk." Target electrodes 81 through 90 of the selector tube and the associated spade electrodes 11 through 20 are individually connected to positive 250 volt battery source 113 through resistances 103, 104, 105, 106, 107, 108, 109, 110, 111, and 112 which may each have a value of the order of 100,000 ohms. It should be noted that the positive terminal of 250 volt battery source 113 is also connected to the accelerating electrode 79 of the selector tube through conductor 114.

The signal input to be sampled is applied upon terminals 115 and 116 of the primary winding 117. The center tapped secondary winding 118 has one of its terminals connected to deflecting plate 119 and the other of its terminals connected to deflecting plate 80. The center tap is connected to accelerating anode 79. Periodic pulses having the frequency of the desired sampling frequency are applied to the terminal 120. Circuit paths for these periodic pulses can be traced through pluse stretcher 121 to the cathode 770 and through conductor 122 to the grid 123 of triode 124 which can be of the type 5687 manufactured by the Tung Sol Electric Company, a corporation of Delaware. The plate 125 of triode 124 is connected to the cathode 10 of the tube within dotted block 135 (which hereinafter will be referred to as tube 135) through conductor 127. The cathode 128 of triode 124 is connected to ground through variable resistor 129 which may have a working value of the order of 2,000 ohms. The function of tube 124 is to provide a change in potential for cathode 10 in response to the said periodic pulse applied to the grid 123 of tube 124. More specifically, when the negative periodic pulse is applied to grid 123 of tube 124 the plate 125 thereof becomes positive causing the cathode 10 of tube 135 to become positive so that the potential gradient is decreased between cathode 10 and the spade electrodes 11 through 20 and anode 24 of tube 135 to such an extent that the electron beam of tube 135 is effectively cut off. In the absence of a negative pulse applied to grid 123 of tube 124, plate 125 thereof is at a negative potential due to the plate current flow therethrough, thus causing cathode 10 to be at a negative potential with respect to spade electrodes 11 through 20 and anode electrode 24. Tube 135 therefore forms a beam.

It is to be noted that the ohmic value of the resistances 103 through 112 is determined largely by the amount of electron beam current falling on any pre-selected target 81 through 90 of the selector tube. The purpose of the resistances 103 through 112 is to produce a potential drop thereacross of sufficient magnitude to cause the associated spade electrode of spade electrodes 11 through 20 to assume a potential equal to or less than that of cathode 10 of tube 135. In the embodiment shown in Fig. 3 the cathode 10, in the absence of a negative cut off pulse being applied thereto, is at a potential of 150 volts and the spade electrodes are at a potential of 250 volts. Thus, the potential of the spade electrode upon which it is desired to have the electron beam impinge must be decreased to that approximately equal to cathode 10 potential or below. Since battery source 113 is at a positive 250 volts there must be a current of approximately one milliampere flowing through any one of the resistances 103 through 112 to cause the potential of the associated spade electrode to drop to 150 volts. As a practical matter, however, this much current is not required to be derived from an electron beam impinging upon a preselected target 81 through 90 of the selector tube inasmuch as when the potential of a particular spaced electrode 11 through 20 begins to approach the cathode potential, some current will flow from the cathode 10 to the particular spade electrode being utilized and will be added to the current from the selector tube through the associated resistances 103 through 112 to increase the potential drop across resistances 103 through 112.

The feedback thus initiated, that is, the decreasing spade voltage with consequent increasing cathode 10 current flow which further decreases the spade voltage, quickly causes the electron beam of tube 135 to lock in on the selected spade electrode.

It should be noted that the selector tube can be any one of several well known types of cathode ray tubes having a plurality of individually selectable target electrodes. Other types of devices having a plurality of individually selectable outputs may also be utilized. A particular type cathode ray tube having a plurality of such target electrodes which can be used in the invention is identified as Type K1059 Target Cathode Ray Tube manufactured by the Allen B. Du Mont Laboratories, Inc., a corporation of the State of New Jersey.

Referring now to Figs. 1 and 2, the operation of the structure shown in Fig. 1 will be described with reference to Fig. 2 wherein a schematic view of said structure is shown with some external circuitry. In general, each time a negative pulse is applied to the anode 61 of Fig. 2 the electron beam is caused to step from one pocket to an adjacent pocket. A pocket is defined as that area bounded by two adjacent spade electrodes and the portion of the anode 61 therebetween. The electron beam can also be caused to impinge into a certain pocket by applying a negative pulse to a particular spade electrode. In tubes of this type an electron beam tends to follow an equipotential path established by proper parameters of the respective crossed electric and magnetic fields. Consequently, in Fig. 2, if the spade electrodes 50 through 59 are maintained at a positive 250 volts, the anode 61 is maintained at a positive 250 volts potential, and the cathode 60 at 150 volts potential, the electron beam originating at the cathode 60 would ordinarily never impinge upon the spades 50 through 59 or the anode 61. When a spade electrode is reduced to cathode potential or below, an equipotential line can then be traced from the cathode to a point between that spade electrode and the anode. If the beam is in one pocket and the anode potential is reduced to near or below cathode potential the beam will switch one or more pockets, depending on the duration of time during which the anode potential is reduced.

More specifically, the case where a negative pulse is applied to the spade electrode will be discussed first. When the power is first applied to the tube, a zeroizing or indexing negative pulse can be applied to terminal 62 to cause spade electrode 50 to assume the potential of said negative input pulse. If this input pulse approaches or is negative with respect to the potential of the cathode 60, a portion of the electron beam will flow to the spade electrode 50 since the electron beam will follow an equipotential line which is established between spade electrode 50 and anode 61. Once the electron beam impinges upon spade electrode 50 it becomes locked in through resistance 63. Apparently the path of the electron beam tends to rotate in a clockwise direction until only a small portion of the electron beam continues to impinge upon spade electrode 50 and the remainder of the electron beam impinges upon that portion of the anode 61 between spade electrode 50 and spade electrode 51. The negative input pulse impressed upon terminal 62 can be removed and the electron beam will continue to impinge upon said portions of the anode 61 and spade electrode 50 since the electron beam current flowing through resistance 63 maintains the potential at spade 50 at a sufficiently low value as to maintain the beam at that position. Thus, upon initial operation of the tube, the electron beam can be caused to always flow to the same position. In effect, a negative pulse applied upon input lead 62 has the result of zeroizing or indexing the tube to a particular position.

The electron beam can then be made to step or advance from one pocket to the next adjacent pocket and thence to the next following adjacent pocket by the successful application of input pulses upon conductor 64 which is connected to anode 61. If the pulse duration is sufficient, the beam may of course be advanced more than one position, as mentioned previously. These input pulses in the circuit shown in Fig. 2 are of a negative potential. The first negative potential pulses which are applied upon the anode 61 through input conductor 64 establish an equipotential line somewhere between spade 51 and anode 61, assuming that the electron beam prior to this pulse is at its zero position and is being directed to the pocket between spades 50 and 51. The new equipotential line created between spade 51 and anode 61 will permit the electron beam to rotate in a clockwise direction (assuming the magnetic field has the proper polarity) with reference to Fig 2 until a portion of it impinges upon spade electrode 51 and the remainder impinges upon that portion of anode 61 between spade electrodes 50 and 51. As soon as the electron beam impinges upon spade electrode 51 it creates a current in a path which may be traced from the cathode 60 to spade electrode 51, resistance 65, conductor 66, conductor 67, conductor 68 to positive 250 volt battery source 69.

The potential drop across resistance 65 due to this current creates an equipotential line at substantially cathode potential from the cathode 60 to spade electrode 51. Inasmuch as the entire surface of the spade electrode 51 is at this low potential, and since the center line of the path of the electron beam will tend to rotate in a clockwise direction with reference to Fig. 2, the greater portion of the electron beam will be caused to impinge upon that portion of the anode 61 between spade electrode 51 and spade electrode 52. This said greater portion of the electron beam will impinge upon the portion of the anode adjacent the spade electrode and which contains the associated column of apertures. A portion of the electron beam will pass through the apertures and impinge upon the collector rings behind the apertures in accordance with a predetermined code. The output signals are then available as voltage drops across resistances 70, 71, 72 and 73 which are individually connected to the four collector rings. A small portion of the electron beam, however, will remain impinged upon spade electrode 51 to maintain the electron beam in a locked position. Application of another negative pulse upon the anode 61 will cause the electron beam to transfer to the pocket defined between the spade electrode 52 and 53. By application of successive negative input pulses upon input conductor 64 the electron beam can be caused to move successively from pocket to pocket in a clockwise direction (assuming proper polarity of the magnetic field).

As mentioned hereinbefore the position of the electron beam may be determined by application of a negative pulse to a particular spade electrode as well as by a series of negative pulses upon the anode of the tube. More specifically, a cathode equipotential line suitable for beam switching and holding purposes can be created from a path extending from the cathode to the spade between any preselected spade electrode and the anode by applying a negative voltage pulse upon the said preselected spade electrode. For example, as hereinbefore described the zeroizing or indexing means of the structure shown in Fig. 2 operates on this principle; that is to say, in order to zeroize or index the structure shown in Fig 2, which, by definition means to cause the electron beam to impinge in that pocket defined by spade electrodes 50 and 51, a negative pulse is applied to spade electrode 50 upon conductor 62 through resistance 63. Similarly, by proper circuitry a negative pulse can be applied upon one of spade electrodes 50 through 59. If subsequent to the application of the negative pulse upon a particular spade electrode, but before the termination of said negative pulse upon said preselected spade electrode, the potential of the cathode is brought to or near ground potential, the electron beam will be generated and accelerated along an approximately equipotential path extending from the said cathode to said preselected spade electrode. It is to be noted that it is a characteristic of this tube type under one set of operating conditions that if the electron beam is turned on (that is to say, the cathode maintained at a negative potential with respect to the anode and those spades to which the electron beam is not directed) during the time that switching of the electron beam is effected from one spade electrode to another spade electrode, that such switching tends to only take place within a range of four or five spade electrodes in the direction in which the electron beam would normally tend to rotate.

The operation of the structure shown in Fig. 3 will now be discussed in detail. In general, the signal input to be sampled is continuously applied to leads 115 and 116. The potential applied to deflection plates 80 and 119 will vary depending upon the potential of the signal impressed upon leads 115 and 116. The electron beam of the selector tube is not in an "on" condition at all times. The "on" condition of the electron beam is herein defined as that condition where an electron beam is caused to impinge upon one of the target electrodes 81 through 90. It is only in the "on" condition at the particular time that a sampling is to occur. The turning on of the electron beam is accomplished by applying a negative pulse upon conductor 120 through pulse stretcher element 121 to cause the cathode 770 to become negative with respect to focussing anode 780. The electron beam thus generated and accelerated impinges upon one of the targets 81 through 90 depending upon the magnitude of the potential on the deflecting plates 80 and 119 at that particular moment in time which in turn is proportional to the strength or value of the signal input applied to leads 115 and 116 during the same interval of time. A current flow is thus caused through one of the resistors 103 through 112 which decreases the potential of one of the spade electrodes 11 through 20 associated with the particular one or ones of the target electrodes 81 through 90 upon which the electron beam of the selector tube is impinging. The same negative pulse as applied to the cathode 770 is applied simultaneously to the grid 123 of tube 124, the plate 125 of which is connected to the cathode 10 of tube 135 so that the resulting positive output pulse from tube 124 is effective to cause the electron beam in said tube 135 to be in an off condition. However, this positive pulse applied to cathode 10 of tube 135 is usually removed prior to the removal of the stretched negative pulse impressed upon cathode 770 of the selector tube, thus permitting the electron beam in tube 135 to be in an "on" condition during the time interval that the electron beam of the selector tube is impinging upon a particular one of target electrodes 81 through 90. Consequently, the electron beam in tube 135 becomes locked upon the particular one of the spade electrodes 11 through 20 which is connected to the one of the target electrodes 81–90 upon which the electron beam of the selector tube impinged. It is to be noted that the electron beam in tube 135 must be cut off during the time that selection of a particular target electrode in the selector tube is being made since the electron beam in tube 135 might have become locked in upon a particular spade electrode from a prior operation from which it could not move to the new spade electrode chosen by the sampling operation subsequent to said prior sampling operation.

Figure 4:
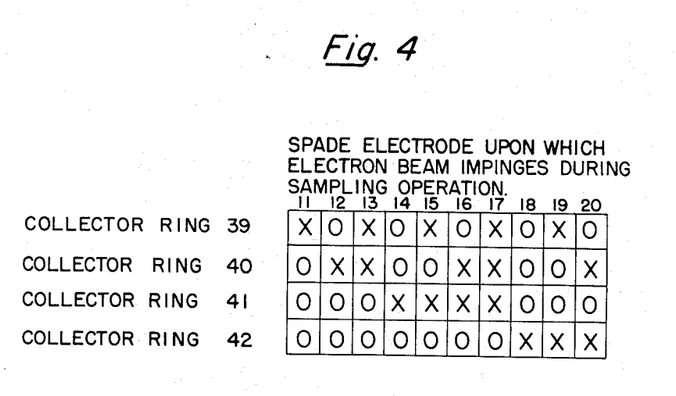
Fig. 4 is a chart showing the coded output of the collector rings versus the energized spade electrode.

Referring now to Fig. 4 there is shown a chart of the coded output of the collector rings versus the spade electrode upon which the electron beam impinges. The particular spade electrode upon which the electron beam impinges is representative of the amplitude of the sample signal. The symbol "X" indicates the energization of a particular collector ring and the symbol "0" represents no energization. For example, when the electron beam impinges on spade electrode 11, collector ring 39 is energized, but collector rings 40, 41, and 42 are not. Since the code is in binary form this indicates a value of 2° or 1. Other electron beam positions and the values of the associated outputs can be readily seen from an inspection of the chart of Fig. 4. It should be noted that in Fig. 3 the outputs of the collector rings can be measured by the voltage drops across collector ring resistances 70, 71, 72, and 73.

Figure 5:
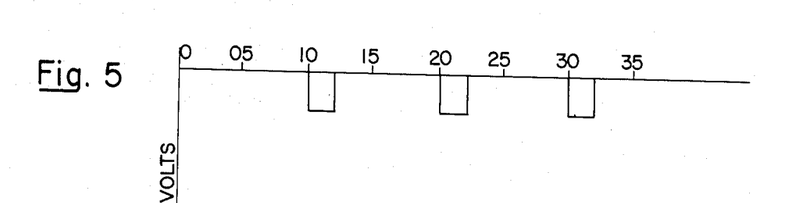
Fig. 5 shows a series of typical stretched pulses applied to the selector tube.
Figure 6:
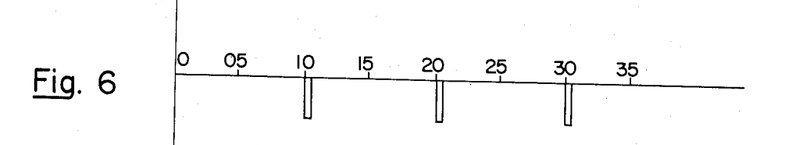
Fig. 6 illustrates a series of typical pulses applied to the grid 123 of tube 124 of Fig. 3.
Figure 8:
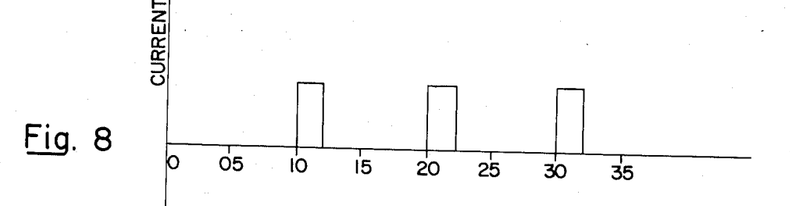
Fig. 8 illustrates the beam current of the selector tube in the time intervals during which the selector tube is energized.
Figure 9:
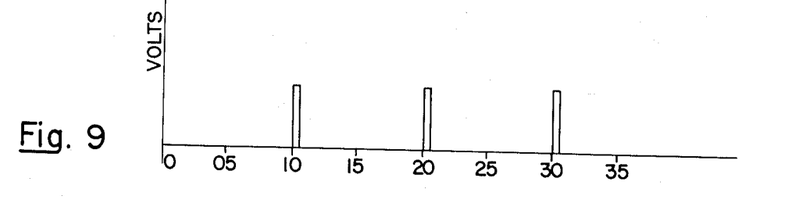
Fig. 9 shows cut-off pulses from plate 125 of tube 124 as applied to cathode 10 of tube 135 of Fig. 3.

Fig. 6 illustrates a typical periodic negative voltage input pulse applied upon terminal 120 of Fig. 3 and to the grid 123 of triode 124 through conductor 122. These same pulses pass through pulse stretcher 121 and are applied to cathode 770, reshaped and lengthened by circuit 121 as shown in Fig. 5. Thus, the electron beam of selector tube 760 is in an on condition during the time intervals of the pulses shown in Fig. 5, the corresponding pulses of beam current being shown in Fig. 8. Fig. 9 shows the positive pulses generated at the plate 125 of tube 124 in response to the negative pulses of Fig. 6 applied to the grid 123 thereof.

Figure 7:
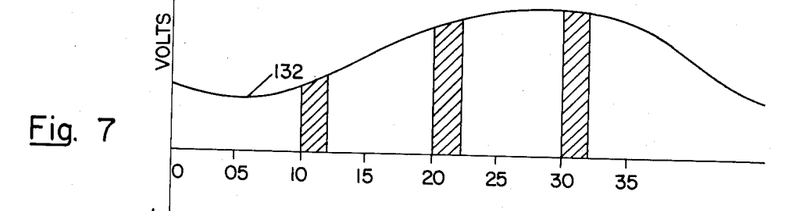
Fig. 7 shows a typical input signal with sampled portions.

Referring to Fig. 7 envelope 132 represents a typical voltage signal impressed upon input leads 115 and 116. The horizontal extent of the hatched portions appearing under curve 132 represent the portion of the time the selector tube electron beam is turned on as determined by the pulses applied to the cathode 770, shown in Fig. 5. The amplitudes of the hatched sections appearing under curve 132 of Fig. 7 represent the instantaneous voltage amplitudes appearing across the deflection plates 80 and 119. The shape of the curve 132 is purely arbitrary. It could represent any signal impressed across signal input leads 115 and 116. As can be seen from the selected curve 132, at the three different sampling times the electron beam is turned on as shown by the plot of beam current in Fig. 8, beginning at time 10 microseconds, time 20 microseconds, and time 30 microseconds, the instantaneous voltage applied across deflection plates 80 and 119 is different. Consequently, the deflection of the electron beam will be different in accordance with the difference of the amplitudes of the sampled instantaneous voltages, and the electron beam accordingly will fall on different target electrodes indicative of the amplitude of the sampled instantaneous voltages. As discussed hereinbefore, during the time that the pulses shown in Fig. 6 are applied to the grid 123 of tube 124 the electron beam of tube 135 is in an off condition and at the expiration of each of the pulses shown in Fig. 6 the electron beam of the tube 135 assumes an on condition for an interval of time corresponding to a portion of the time the electron beam of the selector tube is in an on condition as well as thereafter until the next negative pulse of Fig. 6 occurs unless the electron beam of tube 135 is otherwise cut off.

The pulses applied on input conductor 120 can have a duration of the order of 0.5 microsecond and in the illustrated embodiment of the invention an amplitude of from 20 to 40 volts. The reshaped and stretched pulse impressed upon cathode 770 can have a duration of the order of 1.0 microsecond at an amplitude of from 20 to 45 volts. It should be noted that the pulse applied to cathode 770 of the selector tube and the pulse applied to grid 123 of triode 124 may be derived from a common source and that the former pulse may be stretched and reshaped, whereas the latter pulse is applied directly from the source. The frequency of operation can be of the order of a half megacycle or greater depending on circuit constants used and the particular engineering design employed.

In the specific operation of the device, assume that the strength of the input signal at time 10 of Fig. 7 is sufficient to cause the deflection of the electron beam onto target 84. Thus, when the electron beam is turned on by a pulse beginning at time 10 microseconds in Fig. 5 it will impinge upon target electrode 84. At the same time, a pulse beginning at time 10 microseconds appearing in Fig. 6 is impressed upon the grid 123 of triode 124, the plate of which is connected to the cathode 10 of tube 135 to cause the electron beam thereof to be in an off condition. The electron beam current impinging upon target electrode 84 of the selector tube flows through conductor 133, conductor 134, resistor 106 to positive 250 volt battery source 113 producing a voltage drop across resistor 106 and decreasing the potential of target electrode 84. Since spade electrode 18 of tube 135 is electrically connected to target electrode 84 of the selector tube the potential of said spade electrode 18 will also be decreased as previously discussed. In accordance with the operation of the tube structure 135 as discussed in connection with Fig. 1 and Fig. 2 the electron beam may be caused to impinge upon spade electrode 18 and lock thereon. It is to be noted that only a portion of the electron beam is required to impinge upon spade electrode 18 to cause said electron beam to lock thereon. The remainder of said electron beam passes through the apertures provided in anode 24 and impinges upon the collector rings 39, 40, 41, and 42 in accordance with the particular code associated with that position of the electron beam. Reference to the description of Fig. 1 is hereby made.

It is to be noted that the forms of the invention herein shown and described are but specific embodiments of the same and that various changes may be made in circuit constants used, arrangement, type coding tubes used, and type selector tubes used without departing from the spirit or scope of the invention. A continuation-in-part of the present application, application Serial No. 405,613 was filed January 22, 1954.

What is claimed is:

1. Signal sampling apparatus comprising selector means and encoding means, said selector means comprising input means for receiving input signals, a plurality of output means, means to energize individual ones of said plurality of output means at separate times in accordance with the amplitude of the signal received by the input means at such times, said encoding means comprising a plurality of input elements, each of said input elements of the encoding means being individually associated with and energizable by individual ones of said plurality of output means of the selector means, a plurality of coded output elements associated with different ones of said plurality of input elements of the encoding means and adapted to be individually energized in a coded manner in accordance with the energization of the associated ones of said plurality of input elements, and means for momentarily interrupting the energization of said coded output elements during the times any one of the plurality of input elements of the encoding means is being energized by any one of the output means of the selector means.

2. Pulse sampling apparatus comprising selector means and encoding means, said selector means comprising a plurality of individually energizable output elements and an input means responsive to the amplitude of an input signal to cause energization of different ones of said plurality of output elements in accordance with different amplitudes of the sampling pulse, said encoding means comprising a hermetically sealed envelope having included therein a cathode, an anode having a plurality of coded columns of holes therein and separate collector electrodes on the side of the anode opposite to the cathode, said envelope further containing input means in the form of a plurality of spade electrodes positioned between the cathode and the anode and each adjacent to one of said coded columns of holes, each of said spade electrodes being coupled to and capable of energization by individual ones of said plurality of output elements of said selector means in such a manner that an electron beam will be formed and accelerated toward a selected one of said columns of the holes when a signal to be sampled which has a particular amplitude is applied to said input means to cause energization of a particular one of said plurality of output elements, and means for momentarily interrupting said electron beam when any one of the output elements of the selector means is energized.

3. Signal sampling apparatus comprising a selector tube and a beam switching tube, said selector tube having means including an electron emissive cathode for forming and deflecting an electron beam, a plurality of output elements disposed in the path of said beam, the ones of said output elements on which said beam impinges being arbitrarily controllable, said beam switching tube having an elongated thermionic cathode, means for providing a magnetic field having lines of force which extend through said beam switching tube in substantially parallel relation to said thermionic cathode, said beam switching tube further having a plurality of beam forming and directing electrodes disposed in a circular array about said thermionic cathode, each of said electrodes being directly coupled to a different one of said output elements of said selector tube, each of said electrodes having an impedance including a resistive element connected between itself and a source of potential which is positive with respect to said thermionic cathode for thus lowering the potential of the electrode which is coupled to one of the output elements of said selector tube upon which the electron beam thereof impinges to thereby cause an electron beam to be formed in the beam switching tube and directed from the cathode of said beam switching tube to the electrode having said lowered potential, and means for deriving different output signals from said beam switching tube depending upon the position of the electron beam therewithin.

4. Signal sampling apparatus comprising a selector tube including a plurality of individual output elements and means for forming and deflecting an electron beam upon selected ones of said output elements, a beam switching tube including a thermionic cathode surrounded by a circular array of beam forming and directing electrodes and magnetic field means having lines of force extending through the tube in substantially parallel relation to the cathode, each of said beam forming and directing electrodes being directly coupled to a different one of said individual output elements on said selector tube, and a separate impedance connected between each of said beam forming and directing electrodes and a source of potential which is positive with respect to said thermionic cathode for thus lowering the potential of the electrode which is coupled to one of the output electrodes of said selector tube upon which the electron beam thereof impinges to thereby cause an electron beam to be formed in the beam switching tube and directed from said cathode to the electrode having said lowered potential, and means for obtaining different output signals from said beam switching tube depending on the position of the electron beam therewithin.

5. Signal sampling apparatus comprising a selector tube having a plurality of individual output elements, means for forming and deflecting an electron beam in the selector tube to cause the beam to impinge on selected ones of said output elements, a beam switching tube including a thermionic cathode, an array of beam forming and directing electrodes disposed in spaced relation to said thermionic cathode, means for providing a magnetic field having lines of force extending into said beam switching tube in substantially parallel relation to said cathode, circuit means separately coupling each of said output elements with a different one of said electrodes, a source of positive potential, a separate impedance including a resistive element connected between each of said electrodes and said source of potential to thereby cause the lowering of the potential of the electrode which is coupled to the output electrode of the selector tube upon which said electron beam impinges, and means for deriving different output signals from said beam switching tube depending upon the electrode therein which has its potential thus lowered.

6. Pulse sampling apparatus comprising a selector tube including a plurality of individual output elements and pulse responsive means for forming an electron beam therein and for deflecting the beam upon a selected one of the output elements, a beam switching tube including a thermionic cathode, an array of beam forming and directing electrodes disposed in spaced relation to said cathode, a magnetic field having lines of force in said beam switching tube extending substantially parallel to said cathode, means directly coupling each of said electrodes to a different one of said output elements of said selector tube, a source of potential which is positive with respect to said cathode, means including a separate resistive element connected between each of said electrodes and said source of potential for lowering the potential of the electrode which is coupled to the output element of said selector tube upon which the electron beam therein impinges and thereby causing an electron beam to be formed in said beam switching tube and directed from the cathode to the electrode which has the lowered potential, means for applying successive pulses to said pulse responsive means, and means for momentarily extinguishing the electron beam in said beam switching tube during the time the pulses are applied to said pulse responsive means.

7. Pulse sampling apparatus comprising a selector tube including an electron gun for providing an electron beam, an array of individual output elements, said array of output elements being disposed in the path of said electron beam, means for deflecting said electron beam in response to the amplitude of a signal to be sampled to cause said electron beam to impinge on selected ones of the output elements, a beam switching tube including an array of beam forming and directing electrodes, an electron emissive thermionic cathode disposed on one side of said array of electrodes, and a plurality of output electrodes disposed adjacent to but insulated from said array of beam forming and directing electrodes and on the side thereof which is opposite to said cathode, each of said output elements of said selector tube being individually electrically coupled to a different one of said beam forming and directing electrodes, means including a separate impedance element connected between each of said beam forming and directing electrodes and a source of potential which is positive with respect to said cathode in order to lower the potential of the beam forming and directing electrode which is coupled to the output element of said selector tube upon which said electron beam thereof impinges to thereby cause an electron flow between said thermionic cathode and the beam forming and directing electrode having said lowered potential, a portion of said flow being received by an adjacent one of said output electrodes, and means for momentarily extinguishing the electron beam in said beam switching tube while simultaneously sampling said signal in said selector tube.

8. In pulse sampling apparatus, a selector tube including a plurality of individual output elements, pulse responsive means for forming an electron beam in the selector tube, signal responsive means for deflecting the beam thus formed for impingement upon a selected one of said output elements at the time a pulse is received, means for applying a pulse to said pulse responsive means for forming an electron beam at spaced intervals of time, a beam switching tube including a thermionic cathode, a plurality of beam forming and directing electrodes disposed in spaced relation to the cathode, magnetic field means having lines of force in said beam switching tube extending substantially parallel to said cathode, a separate means electrically coupling each of said electrodes with a different one of said output elements of the selector tube, impedance means connected to each of said electrodes and operable to lower the potential of the electrode coupled to the output element of the selector tube upon which the electron beam impinges to thereby form an electron beam in the beam switching tube directed from the cathode toward the electrode having said lowered potential, an output electrode in the beam switching tube associated with each beam forming and directing electrode and operable to receive the electron beam directed theretoward and to provide an output signal, and means for momentarily extinguishing the electron beam in the beam switching tube in time relation to the application of pulses to said pulse responsive means of the selector tube.

9. Pulse sampling apparatus comprising a selector tube having a plurality of individual output elements, means for forming and deflecting an electron beam for impingement on a selected one of said output elements, a beam switching tube comprising a thermionic cathode, an array of circularly spaced apart beam forming and directing electrodes disposed around said cathode, magnetic field means having lines of force in said beam switching tube extending substantially parallel to said cathode, each of said beam forming and directing electrodes of the beam switching tube being directly coupled to a different one of said output elements of said selector tube, a source of potential which is positive with respect to said cathode, a separate impedance including a resistive element connected between each of said beam forming and directing electrodes and said source of potential and operable to lower the potential of the electrode which is coupled to the output element of said selector tube upon which said electron beam impinges to thereby produce an electron beam between said cathode and the electrode having said lowered potential, and a plurality of output electrodes in said beam switching tube circularly disposed around the outside of said array of beam forming and directing electrodes, each of said output electrodes being arranged to receive at least a portion of the electron beam produced in said beam switching tube and to provide an output signal which is indicative of the position of the electron beam within the beam switching tube.

10. The apparatus described in claim 9 characterized by the provision of means for controlling said electron beam forming and deflecting means of the selector tube so as to shift the beam from one to another of said output elements at spaced intervals of time, and means for momentarily extinguishing the electron beam of the beam switching tube during the shifting of the electron beam in the selector tube from one to another of said output elements.

References Cited in the file of this patent

UNITED STATES PATENTS

| | | |
|---|---|---|
| 2,424,289 | Snyder | July 22, 1947 |
| 2,521,229 | Koch | Sept. 5, 1950 |
| 2,551,024 | Levy | May 1, 1951 |
| 2,563,807 | Alfven et al. | Aug. 14, 1951 |
| 2,564,908 | Kuchinsky | Aug. 21, 1951 |
| 2,591,997 | Backmark | Apr. 8, 1952 |
| 2,599,949 | Skellett | June 10, 1952 |
| 2,632,147 | Mohr | Mar. 17, 1953 |